(12) United States Patent
Kim

(10) Patent No.: US 6,359,772 B1
(45) Date of Patent: Mar. 19, 2002

(54) BASE ASSEMBLY FOR VIDEO DISPLAY APPLIANCE

(75) Inventor: Byeong Kook Kim, Daegu Metropolitan (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/664,769

(22) Filed: Sep. 19, 2000

(30) Foreign Application Priority Data

Oct. 20, 1999 (KR) ............................................. 99-40465

(51) Int. Cl.[7] ................................................. H05K 7/00
(52) U.S. Cl. ........................ 361/679; 361/796; 248/917; 248/924
(58) Field of Search ................................ 361/679–682, 361/683–687, 724–727, 752, 755, 796, 826, 827; 364/708.1, 709.11; 709/236; 345/326; 248/917–924

(56) References Cited

U.S. PATENT DOCUMENTS 6,104,444 A * 8/2000 Han et al. .................... 348/836
6,105,919 A * 8/2000 Min ............................. 248/418
6,268,997 B1 * 7/2001 Hong .......................... 361/681

* cited by examiner

Primary Examiner—Leo P. Picard
Assistant Examiner—Hung Van Duong
(74) Attorney, Agent, or Firm—Fleshner & Kim, LLP

(57) ABSTRACT

Disclosed is a base assembly for a video display appliance capable of receiving a keyboard within a front thereof, as well as easily adjusting a tilting angle and a swiveling angle of a monitor. The base assembly comprises an upper base cover integrally formed with a lower portion of the monitor; a lower base cover coupled to the upper base cover and having a hinge accommodating opening on a center thereof; a tilting angle adjusting mechanism, coupled to the upper base cover and provided in the hinge accommodating opening of the lower base cover, for tilting the monitor by applying an operating force to the monitor upwards or downwards; and a swiveling angle adjusting mechanism for rotating the monitor, the upper base cover coupled to the monitor, and the lower base cover in a left or right direction.

10 Claims, 14 Drawing Sheets

BASE ASSEMBLY FOR VIDEO DISPLAY APPLIANCE

BACKGROUND OF THE INVENTION

1. Field of the Invention

The present invention relates to a base assembly for a video display appliance, and more particularly to a base assembly for a video display appliance capable of receiving a keyboard within a front thereof, as well as easily adjusting a tilting angle and a swiveling angle of a monitor.

2. Description of the Related Art

Generally, video display appliances, as shown in FIG. 1, comprise a monitor 1 and a monitor base 2 for supporting the monitor.

The monitor base includes a spherical upper base 2a integrally formed with a lower portion of the monitor 1, and a lower base 2b, coupled to the upper base, for supporting the monitor 1 and the upper base 2a.

With the construction described above, a tilting angle and a swiveling angle of the monitor is adjusted as follows.

To adjust the tilting angle of the monitor, a user may push or pull a front lower portion of the monitor with one band, while the user presses an upper surface of the monitor 1 or the lower base 2b against a table with the other hand.

Also, to adjust the swiveling angle of the monitor, the user may turn the monitor in a left or right direction with one hand, while the user presses the lower base against the table with the other band.

Specifically, the tilting and swiveling angle of the monitor may be adjusted with the relative (sliding) movement of the upper base 2a and the lower base 2b in response to the force acting on the monitor in a desired direction.

With the construction of the prior monitor base, the upper base 2a has to have a spherical shape to achieve the relative movement with the lower base 2b, and the base has to be positioned on an axis vertically passing through a center of weight of the monitor 1 to maintain a moment equilibrium of the monitor. Therefore, such a positioning limit of the monitor causes a cumbersomeness of usage and a difficulty of design.

For example, since the monitor is supported by contact with the base only, if the user wants to adjust the tilting or swiveling angle of the monitor, the user has to apply a significant force to the monitor.

In addition, to adjust the tilting angle of the monitor, the user pushes or pulls the front lower portion of the monitor with one hand, while the user presses the upper surface of the monitor 1 or the lower base 2b against a table with the other hand. Also, to adjust the swiveling angle of the monitor, the user turns the monitor in a left or right direction with one hand, while the user presses the lower base against the table with the other hand.

The adjustment of the tilting angle of the monitor is explained briefly herein. However, the user cannot adjust the tilting angle of the prior monitor by merely applying the operating force to the monitor toward an upper or lower direction. Therefore, in order to adjust the tilting angle of the monitor, the user rotates the monitor in a left or right direction, and simultaneously, pushes up or pulls down on the monitor.

Specifically, since the tilting angle of the prior monitor base cannot be adjusted by merely applying the operating force toward the upper or lower direction, the user applies a composite operating force comprising a tilting force and a rotating force to the monitor.

In addition, since the prior monitor base has a construction consisting of the upper spherical base 2a and the lower plate-typed base 2b, there is a limit in that such a construction does not meet the demand of a user looking for a variety of designs.

Also, the prior monitor base cannot provide a space capable of accommodating a keyboard,

SUMMARY OF THE INVENTION

To resolve the above problems, an object of the present inventions is to provide a base assembly for a video display appliance having a construction capable of easily adjusting a tilting and swiveling angle of a monitor.

Another object of the present invention is to provide a base assembly for a video display appliance capable of adopting a variety of designs to meet the demands of a user.

Still another object of the present invention is to provide a base assembly for a video display appliance having a space for accommodating a keyboard.

To achieve the above objects, according to one aspect of the present invention, there is provided a base assembly for a video display appliance having a monitor, the base assembly comprising: an upper base cover integrally formed with a lower portion of the monitor; a lower base cover coupled to the upper base cover and having a hinge accommodating opening on a center thereof; a tilting angle adjusting mechanism, coupled to the upper base cover and provided in the hinge accommodating opening of the lower base cover, for tilting the monitor by applying an operating force to the monitor upwards or downwards; and a swiveling angle adjusting mechanism for rotating the monitor, the upper base cover coupled to the monitor, and the lower base cover in a left or light direction.

The tilting angle adjusting mechanism includes a hinge assembly, coupled to the upper base cover, for applying a biasing force to the upper base cover, an upper hinge cover coupled to an upper side of the hinge assembly, a lower hinge cover coupled to a lower side of the hinge assembly, and a fastening hole and a fastening boss, each formed on the upper and lower base covers, for interconnecting the upper and lower base covers.

The upper base cover includes a mounting portion directly coupled to a lower portion of the monitor, and a plate base portion integrally formed with a lower portion of the mounting portion and having a constant curvature.

The lower base cover includes a same curvature as that of the plate base portion, an elongated guide hole is formed in left and right sides of the hinge accommodating opening respectively, and an elongated fixing hole is formed between the elongated guide holes formed on the bottom of the lower base cover.

The hinge assembly includes a hinge shaft rotatable by a biasing force of a spring, a mounting bracket provided on both ends of the hinge shaft to be engaged to the upper base cover, respectively, a hinge cover fixing bracket provided at a center of the hinge shaft to be engaged to the upper and lower hinge covers, a torsion spring provided on both ends of the hinge shaft, respectively, with one end engaged to the hinge cover fixing bracket and the other end engaged to the mount bracket, a spring washer, provided on both ends of the hinge shaft, for controlling a tension of the torsion spring, and a locking nut for pressing the spring washer and for preventing the spring washer from being released from the hinge shaft.

The swiveling angle adjusting mechanism includes a friction member positioned in the elongated fixing groove of the lower base cover to reduce a frictional force produced between the base and a ground and to serve as a role of a rotating axis, when the monitor swivels or rotates in a left or right direction, and sliding means positioned in the left and right guide holes of the lower base cover and moving along the holes.

The sliding means includes a sliding member inserted into the hole and having a receiving groove on a lower portion thereof and a flange on an upper portion thereof for a supporting reinforcing rib of the upper base cover, and a friction member positioned in the receiving groove of the sliding member and relatively shifting in the hole together with the sliding member.

BRIEF DESCRIPTION OF DRAWINGS

The above objects, other features and advantages of the present invention will become more apparent by the preferred embodiment described with reference to the accompanying drawings, in which:

FIGS. 8A to 8C are side views illustrating the adjusting operation of a tilting angle of a base assembly according to the present invention, in which FIG. 8A shows a state in which the tilting angle of a monitor is set at 0°, FIG. 8B shows a state in which an elevation angle of the monitor is set at a maximum magnitude, and FIG. 8C shows a state in that a declination angle of the monitor is set at a maximum magnitude.

FIGS. 9A to 9C are bottom views illustrating the adjusting operation of a swiveling angle of a base assembly according to the present invention, in which FIG. 9A is a bottom view of the state in which a monitor is positioned in a center of the base assembly, FIG. 9B is a bottom view of the state in which the monitor is maximally swiveled in a left direction, and FIG. 9C is a bottom view of the state in that the monitor is maximally swiveled in a right direction.

DETAILED DESCRIPTION OF THE PREFERRED EMBODIMENT

A preferred embodiment of the spinning reel according to the present invention will now be explained with reference to the accompanying drawings.

Figure 1:
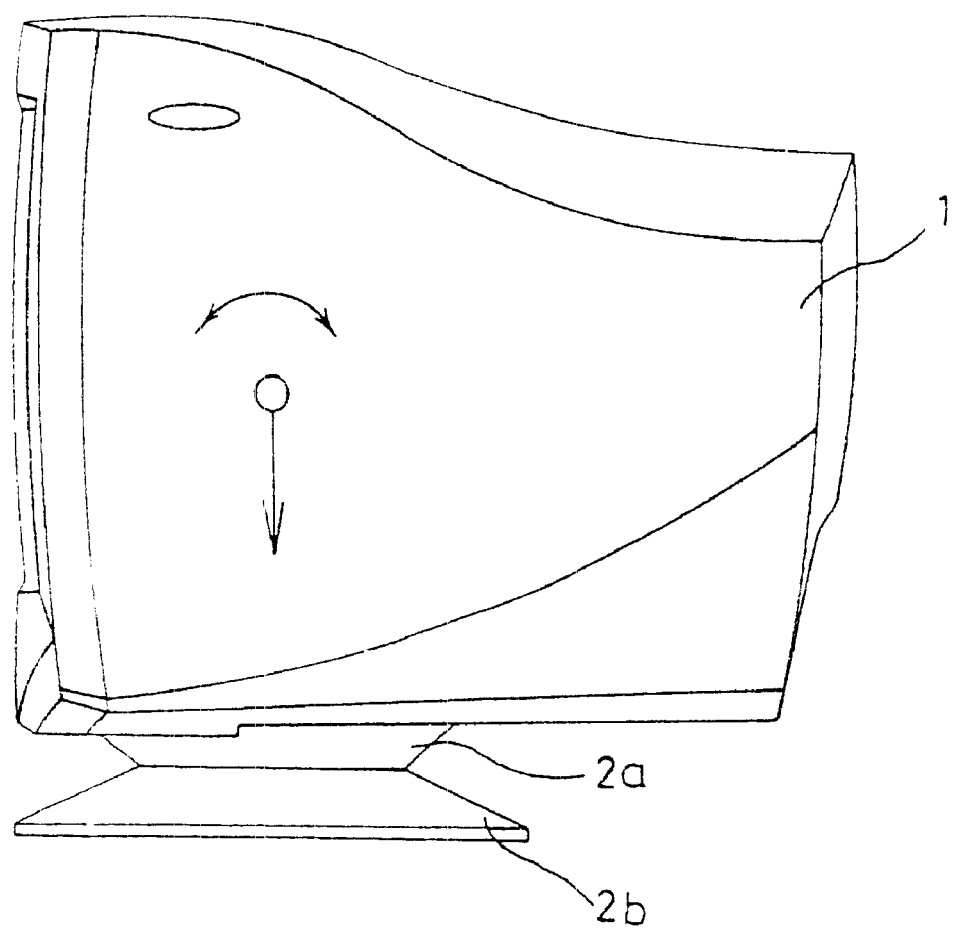
FIG. 1 is a side view illustrating a prior art video display appliance.
Figure 2:
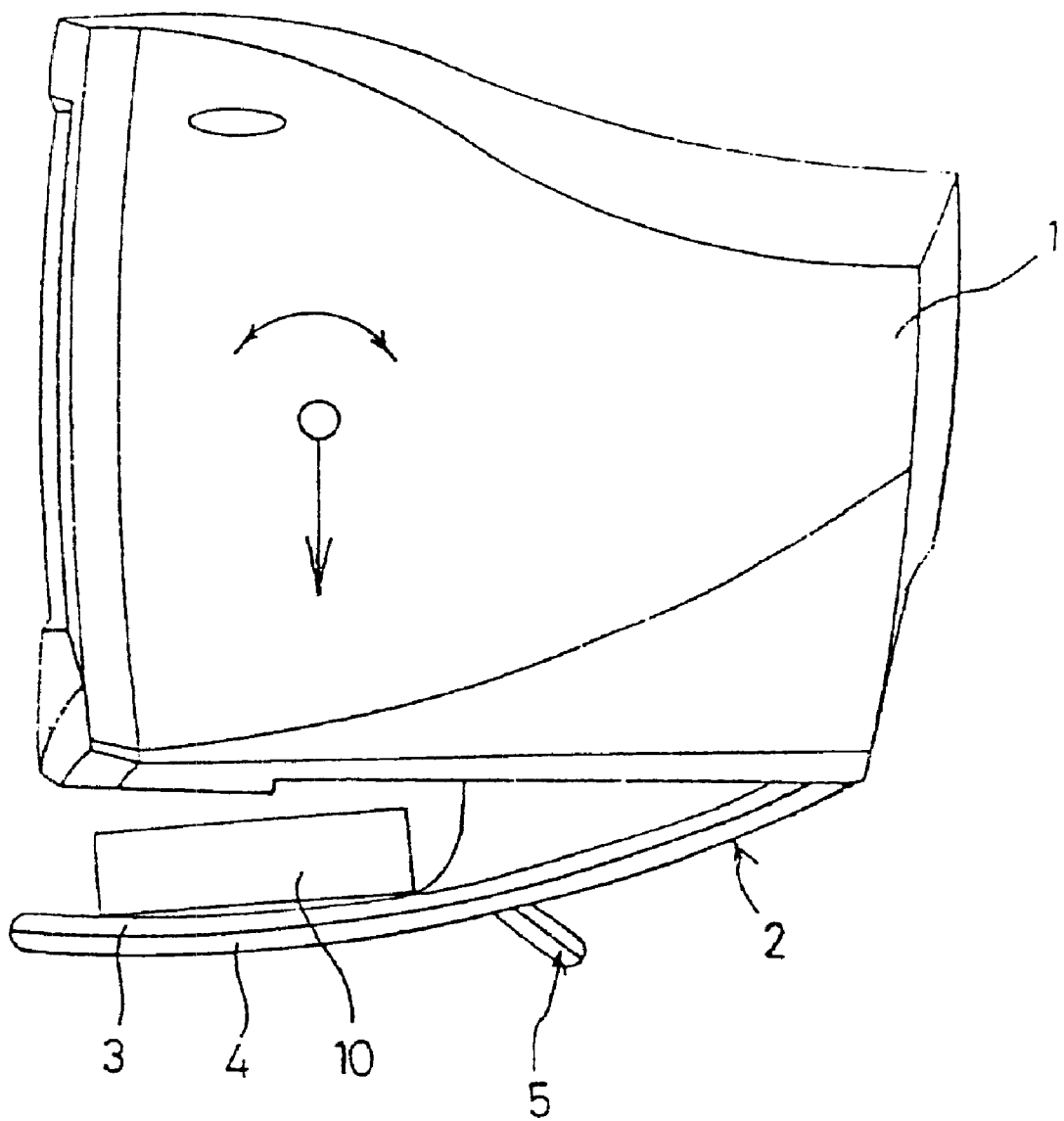
FIG. 2 is a side view illustrating a video display appliance according to one preferred embodiment of the present invention.
Figure 3:
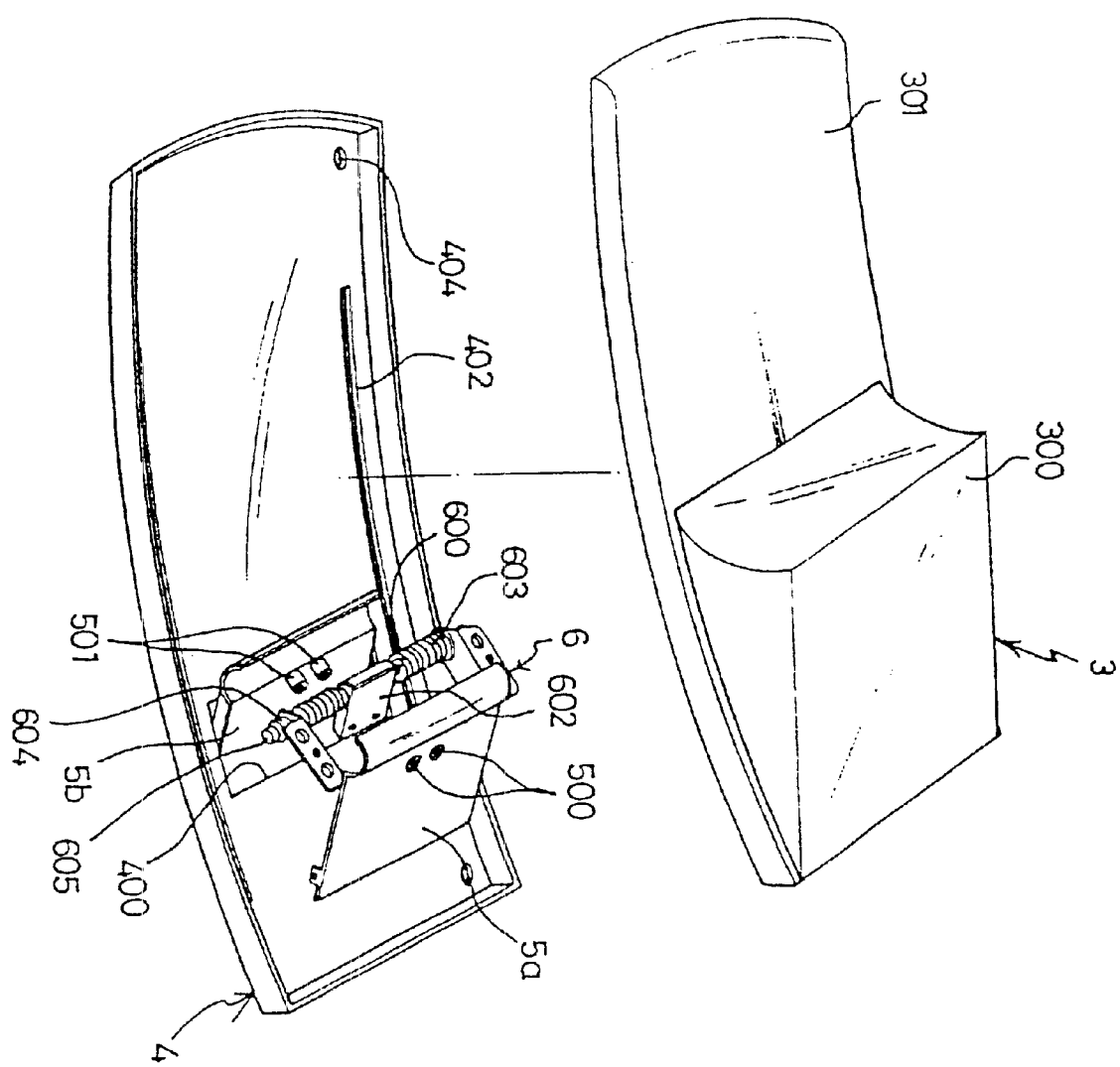
FIG. 3 is an exploded view illustrating the construction of a monitor base assembly of FIG. 2.
Figure 4:
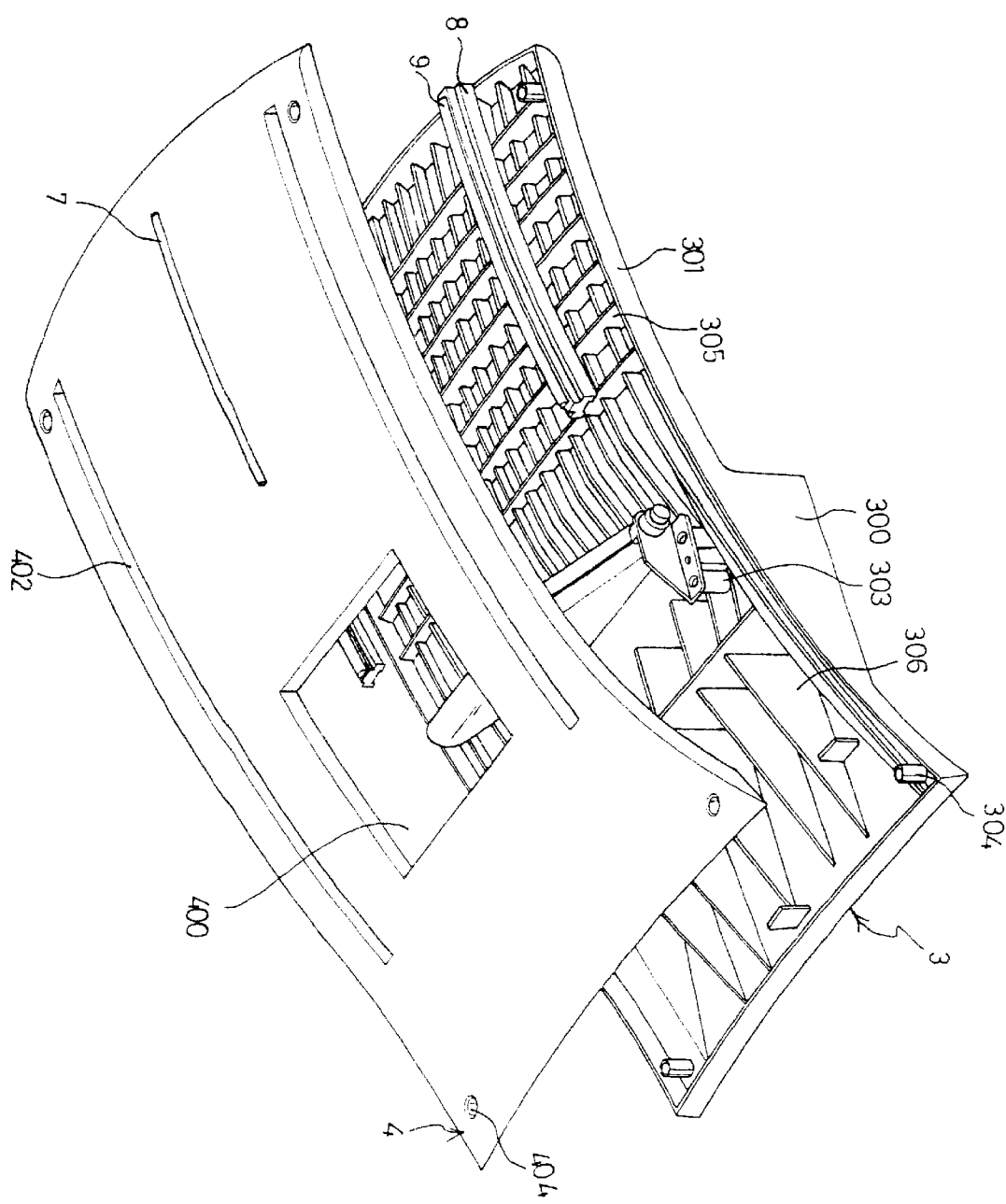
FIG. 4 is a perspective view of a monitor base assembly of FIG. 3.

A base assembly 2 for a video display appliance according to one preferred embodiment of the present invention, as shown in FIGS. 2 to 4, comprises an upper base cover 3 integrally formed with a lower portion of the monitor 1, and a lower base cover 4 coupled to the upper base cover and having a hinge accommodating opening 400 on a center thereof, a tilting angle adjusting mechanism, coupled to the upper base cover 3 and provided in the hinge accommodating opening 400 of the lower base cover 4, for tilting the monitor by applying an operating force to the monitor upwards or downwards, and a swiveling angle adjusting mechanism for rotating the monitor, the upper base cover 3 coupled to the monitor, and the lower base cover 4 in a left or right direction.

Figure 6:
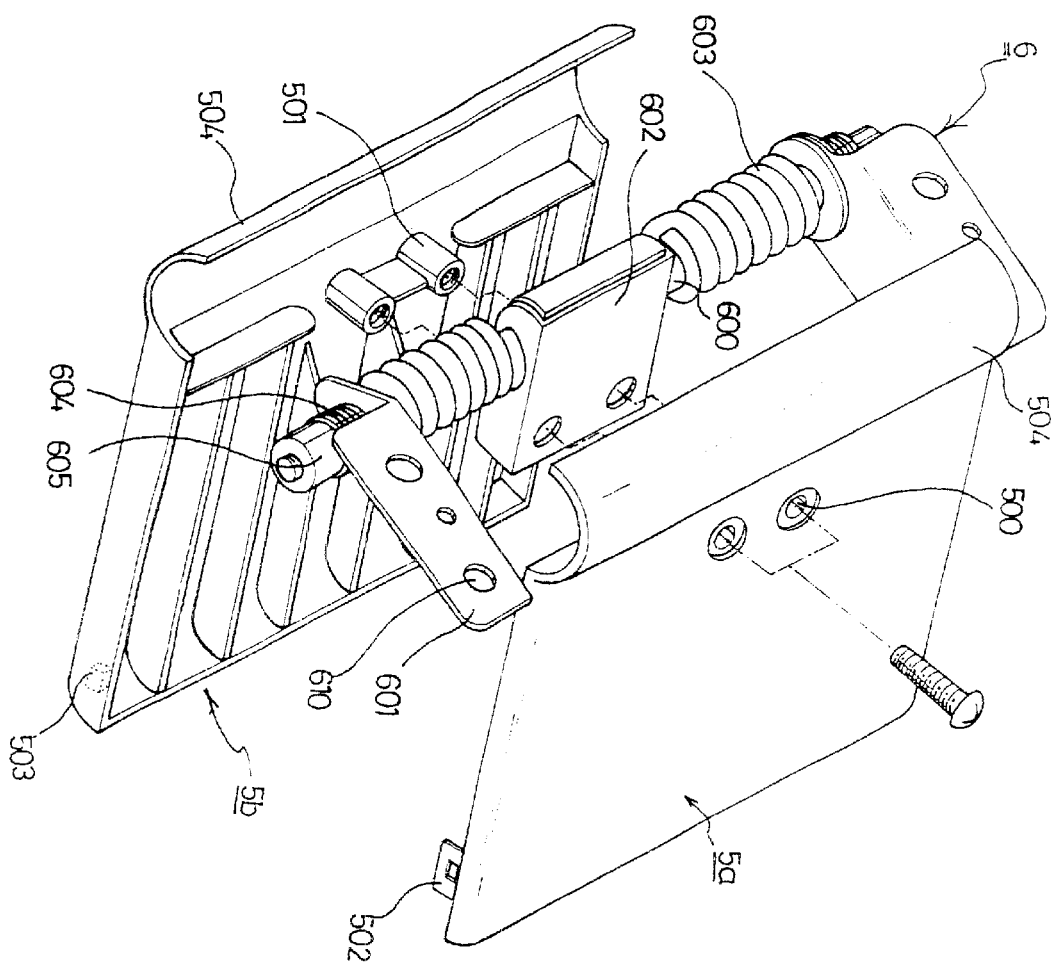
FIG. 6 is an exploded view of a tilting angle adjusting mechanism of FIG. 4.

The tilting angle adjusting mechanism as shown in FIG. 6, includes a hinge assembly 6 coupled to the upper base cover 3, an upper hinge cover 5a coupled to an upper side of the hinge assembly 6, and a lower hinge cover 5b coupled to a lower side of the hinge assembly 6.

The upper base cover 3 includes a mounting portion 300 directly coupled to a lower portion of the monitor 1, and a plate base portion 301 integrally formed with a lower portion of the mounting portion 300 and having a constant curvature.

The lower base cover 4 has the same curvature as that of the plate base portion 301, An elongated guide hole 402 is formed in left and right sides of the hinge accommodating opening 400, respectively, and an elongated fixing hole 401 is formed between the elongated guide holes 402 formed on the bottom of the lower base cover 4.

Figure 7:
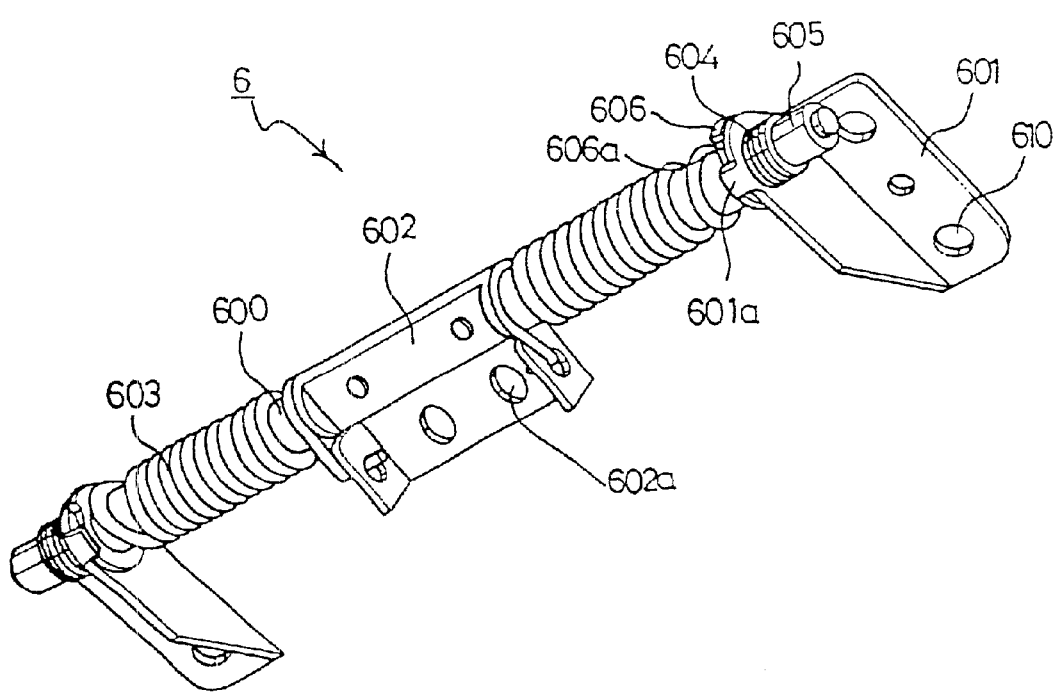
FIG. 7 is a perspective view of a hinge assembly.

The hinge assembly 6, as shown in FIGS. 6 and 7, includes a hinge shaft 600 rotatable by a biasing force of a spring, a mounting bracket 601 provided on both ends of the hinge shaft 600 to be engaged to the upper base cover 3, respectively, a hinge cover fixing bracket 602 provided at a center of the hinge shaft 600 to be engaged to the upper and lower hinge covers 5a and 5b, a torsion spring 603 provided on both ends of the hinge shaft, respectively, with one end engaged to the hinge cover fixing bracket 602 and the other end engaged to the mount bracket 601, a spring washer 604, provided on both ends of the hinge shaft 600, for controlling a tension of the torsion spring 603, and a locking nut 605 for pressing the spring washer 604 and for preventing the spring washer 604 from being released from the hinge shaft.

The mounting bracket 601 is provided on the hinge shaft 600 with a tilting angle setting member 606 with an arc-shaped groove 606a formed along a periphery thereof. The mounting bracket 601 is provided on a lower end thereof with a bent stopper 601a, positioned in the groove 606a of the tilting angle setting member 606, for limiting the tilting angle of the hinge shaft 600.

Figure 5:
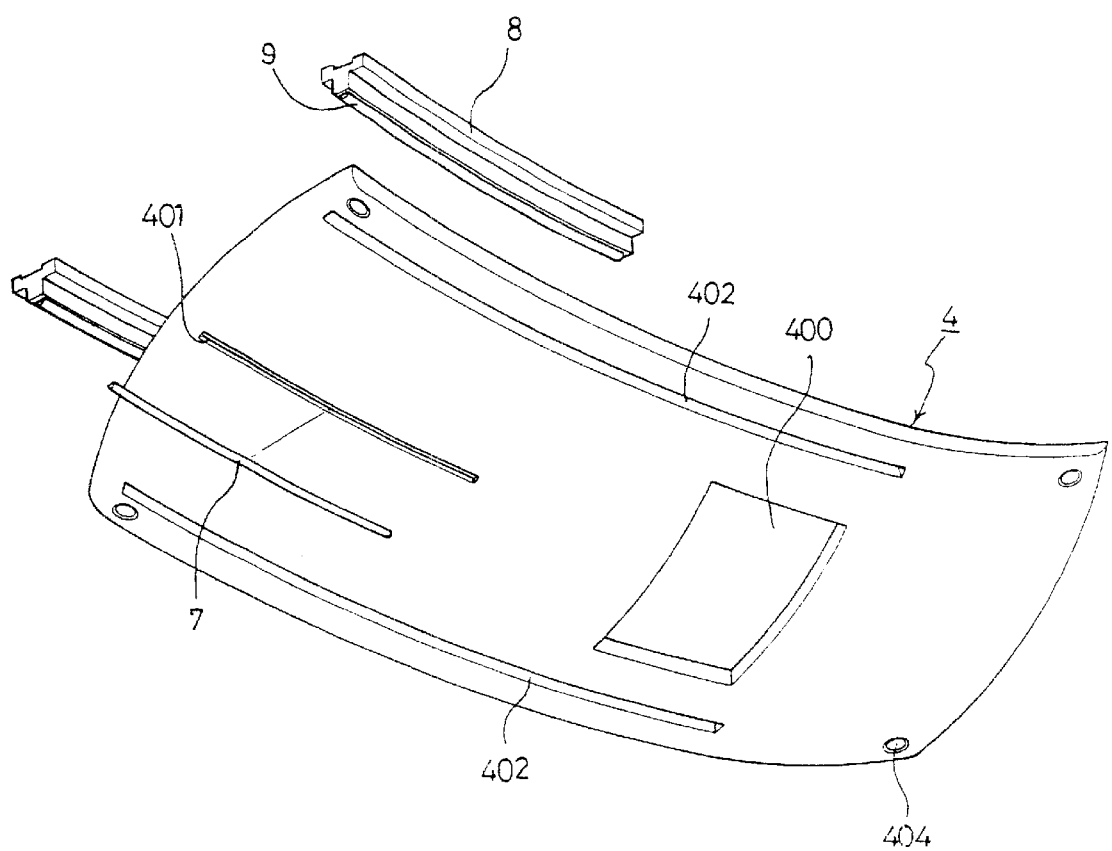
FIG. 5 is an exploded view of a lower base cover.

The swiveling angle adjusting mechanism, as shown in FIGS. 4 and 5, comprises a friction member 7 made of rubber or silicon which is positioned in the elongated fixing groove 401 of the lower base cover 4 to reduce a frictional force produced between the base and a ground and to serve as a rotating axis when the monitor 1 swivels or rotates in a left or right direction, and sliding means positioned in the left and right guide holes 402 of the lower base cover 4 and moving along the holes.

Figure 10:
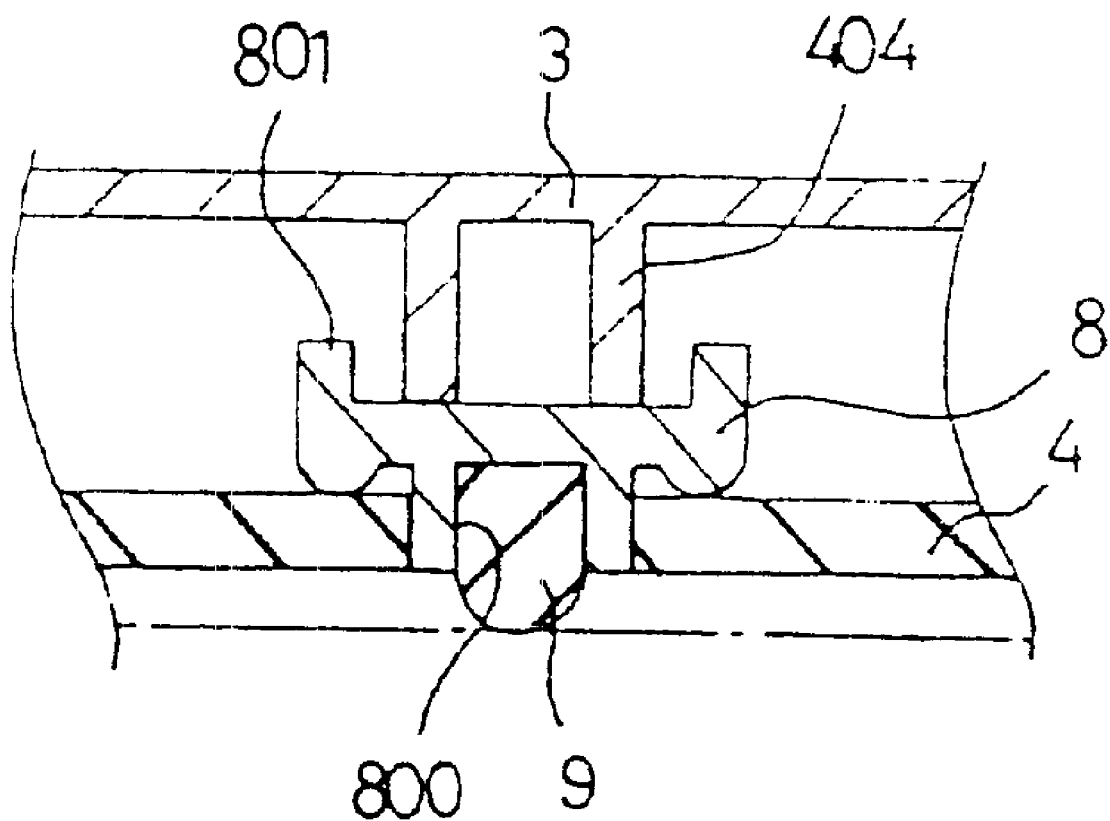
FIG. 10 is a cross-sectional view taken along a line I—I in FIG. 9A.

The sliding means includes a sliding member 8 inserted into the hole 402 and having a receiving groove 800 on a lower portion thereof and a flange 801 on an upper portion thereof for a supporting reinforcing rib 305 or 306 of the upper base cover 3, and a friction member 9 positioned in the receiving groove 800 of the sliding member 8 and relatively shifting in the hole 402 together with the sliding member 8 (see FIG. 10).

Referring to FIG. 4, the upper base cover 3 is provided at a center portion thereof with a hinge assembly mounting boss 303 for fixing the hinge assembly 6 to a bottom of the upper base cover 3. And, the upper base cover 3 is provided at each bottom corner thereof with a fastening boss 304 for fastening the upper base cover to the lower base cover 4.

The bottom of the upper base cover 3 and the top of the lower base cover 4 are provided with a number of reinforcing ribs 305 and 306 for reinforcing the strength of the base covers 3 and 4, respectively.

Referring to FIG. 6, the upper and lower hinge covers 5a and 5b are provided with a fastening hole 500 and a fastening boss 501, respectively, for engaging the upper hinge cover 5a with a hinge lower cover 5b and a hinge assembly 6 by a screw passing through a fastening hole 602a formed on the hinge cover fixing bracket 602 of the hinge assembly 6.

The assembling process of the base assembly for video display appliance according to the present invention will now be explained.

First, the assembling process of the base assembly for video display appliance according to the present invention will be explained with reference to FIGS. 2 to 7.

In order to assemble the video display appliance for display appliance, the tilting angle adjusting mechanism must be assembled first as follows.

As shown in FIG. 6, the upper hinge cover 5a is positioned on the upper portion of the hinge assembly 6, and the lower hinge cover 5b is positioned under the lower portion of the hinge assembly 6. At that time, if the upper hinge cover 5a is pressed against the lower hinge cover 5b in an interconnecting direction, latching bosses 503 formed on inside edges of the lower hinge cover 5b are inserted into latching holes of latching pieces 502 formed on edges of the upper hinge cover 5a, so that the upper and lower hinge covers 5a and 5b are preassembled.

At that time, the hinge shaft 600 of the hinge assembly 6 is positioned in a rounded sliding portion 504 to enclose the hinge shaft 600 along one side of the upper and lower hinge covers 5a and 5b.

After the upper and lower hinge covers 5a and 5b are pre-assembled, the upper hinge cover 5e, the hinge cover fixing bracket 602 of the hinge assembly 6, and the lower hinge cover 5b are fixedly fastened by using a screw.

Accordingly, the assembly of the tilting angle adjusting mechanism consisting of the upper and lower hinge covers 5a and 5b and the hinge assembly 6 is completed.

After the assembly of the tilting angle adjusting mechanism is completed, the swiveling angle adjusting mechanism is assembled to the upper base cover 3 as shown in FIGS. 3 and 4.

Specifically, the fastening groove of the hinge assembly fastening boss 303 formed on the bottom of the upper base cover 3 is positioned to coincide with the fastening hole 610 formed on the mounting bracket 601 of the hinge assembly 6, and is fastened by using the screw, thereby engaging the swiveling angle adjusting mechanism to the upper base cover 3.

And then the lower base cover 4 is assembled to the lower portion of the upper base cover 3.

Specifically, the fastening boss 304 formed on the bottom corner of the upper base cover 3 is positioned to coincide with the fastening hole 404 formed on the corner of the lower base cover 4, and is fastened by using the screw, thereby engaging the upper and lower covers 3 and 4.

At that time, the tilting angle adjusting mechanism is positioned in the hinge accommodating opening 400 of the tower base cover 4.

After the assembly of the base assembly 2 is completed as described above, the mounting portion 300 of the upper base cover 3 is latched to the latching portion (not shown) formed on a lower portion of the monitor, thereby completing the assembly of the monitor and the base assembly.

The adjusting operation of the tilting angle and swiveling angle of the base assembly for video display appliance according to the present invention will now be explained in detail.

First, the adjusting operation of the tilting angle of the base assembly will be explained.

Since the monitor is designed so that the center of weight of the monitor is positioned at a front of the hinge shaft 600 of the hinge assembly, the weight of the monitor is acted on the upper and lower hinge covers of the tilting angle adjusting mechanism, so that a desired torque is acted on the hinge shaft 600 of the hinge assembly 6.

Accordingly, since a desired torsion moment is acted on the torsion spring 603 of the hinge assembly 6 by the torque acting on the hinge shaft 600, the torsion spring 603 offsets the torsion moment produced from the weight of the monitor to maintain the moment equilibrium of the system.

To this end, the torsion spring 603 of the hinge assembly 6 is designed to produce a torque acting in the opposite direction relative to the torque acting on the hinge shaft 600 due to the weight of the monitor 1, thereby maintaining the moment equilibrium of the system.

The operation of the base assembly according to the present invention will now be explained in detail with reference to FIGS. 8A to 9C.

Figure 8A:
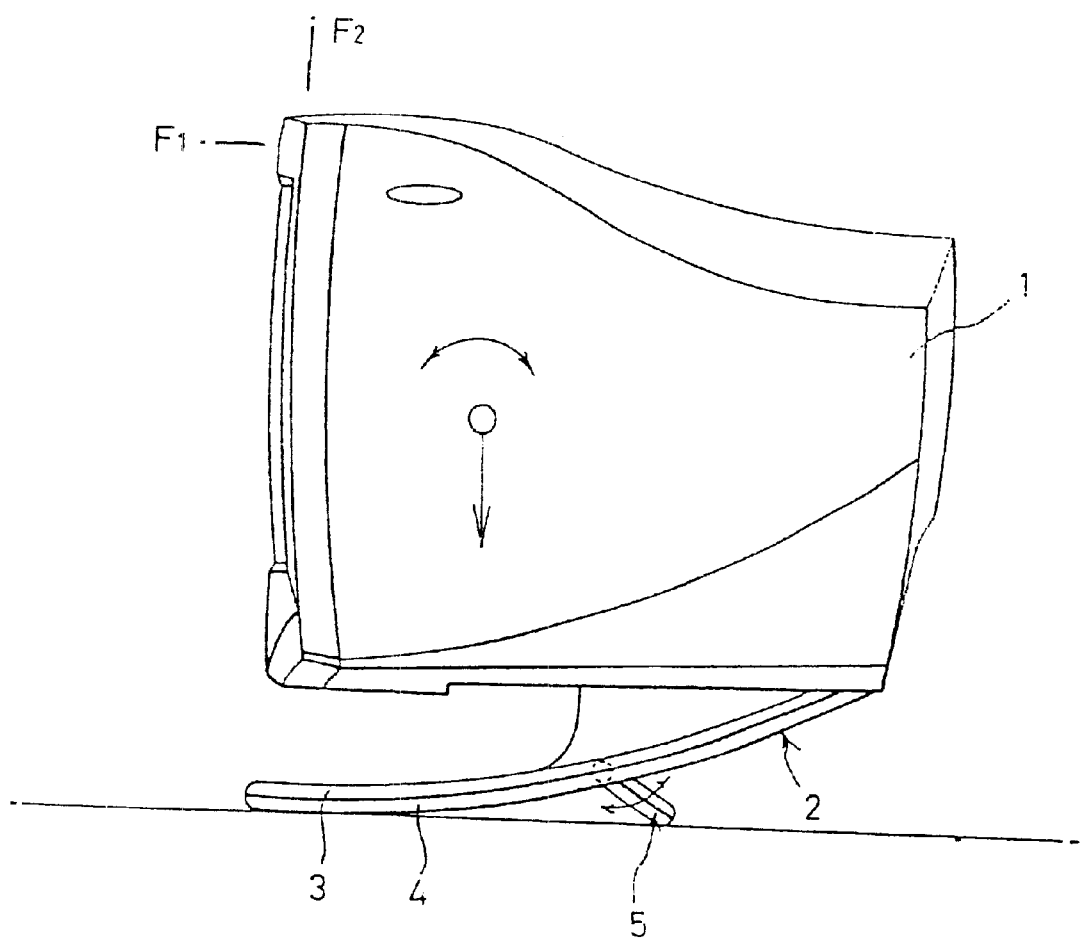

In an initial state where no load acts on the tilting angle adjusting mechanism, if the monitor is positioned on a horizontal surface, each elevation angle and declination angle of the monitor is set to 0° relative to the horizontal surface, as shown in FIG. 8A.

Specifically, in an initial state that no load acts on the tilting angle adjusting mechanism, if the monitor is positioned on a horizontal surface, an amount of the torsion moment acting on the torsion spring of the hinge assembly 6 due to the weight of the monitor exceeds to an amount of the torsion moment that the torsion spring 603 can stand against the deformation. Therefore, the hinge shaft 600 of the hinge assembly 6 overcomes the restoring force of the torsion spring 603, so that the hinge shaft can be rotated in a counterclockwise direction as shown in the figure.

At that time, since the restoring force of the torsion spring is increased relative to the rotating amount of the hinge shaft 600 in a counterclockwise direction, the torsion moment of the torsion spring 603 is also increased.

If the tilting angle adjusting mechanism is rotated by a desired angle in a counterclockwise direction as shown in FIG. 8A, the amount of the torsion moment acting on the hinge shaft 600 is the same as the amount of the torsion moment of the torsion spring 603, so that the monitor is maintained in a state of the moment equilibrium.

When the monitor is set in a horizontal state, the tilting angle adjusting mechanism is rotated to a desired angle in such a direction that an angle between the tilting angle adjusting mechanism and the lower base cover is increased, and then the tilting angle adjusting mechanism is stopped at a position of the moment equilibrium as shown in FIG. 8A.

In a state that the monitor 1 is horizontally set, if a pulling force $F_1$ is applied to the front upper end of the monitor, the hinge shaft 600 of the tilting angle adjusting mechanism is applied with a more rotating moment, so that the moment equilibrium is broken off. Accordingly, until the monitor comes to a moment equilibrium, the tilting angle adjusting mechanism rotates in a counterclockwise direction, so that the elevation angle θc of the monitor is increased.

At that time, the elevation angle θc of the monitor is increased relative to the magnitude of the force $F_1$ applied to the front upper end of the monitor, but the hinge shaft 600 of the hinge assembly 6 may not rotate above a desired angle. Accordingly, the elevation angle of the monitor does not exceed to a predetermined angle.

Figure 8B:
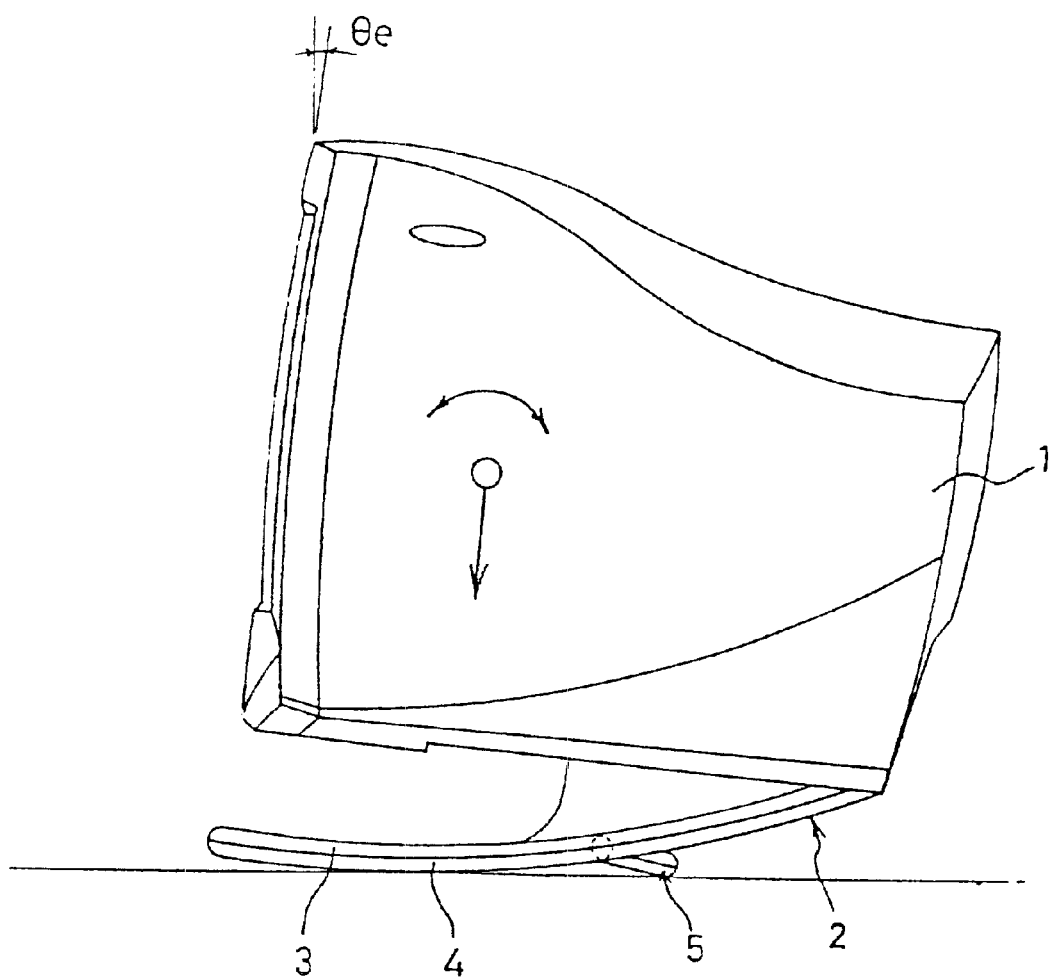
Figure 8C:
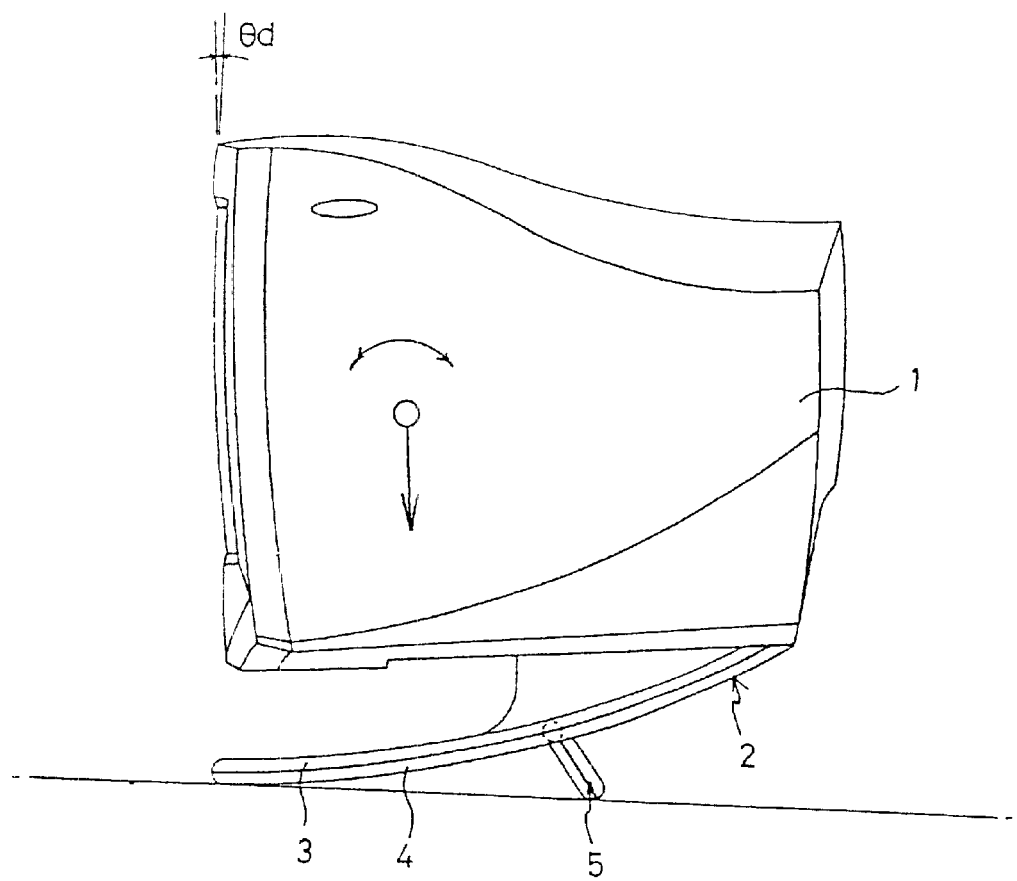

FIG. 8B shows a state in that an elevation angle of the monitor is set to a maximum magnitude, preferably an angle of 10°.

In a state where the monitor 1 is horizontally set as shown in FIG. 8A, if a desired force $F_2$ is applied to the front upper end of the monitor, the rotating moment acting on the hinge shaft 600 of the tilting angle adjusting mechanism is decreased, so that the moment equilibrium is broken off. Accordingly, until the monitor comes to a moment equilibrium, the tilting angle adjusting mechanism rotates in a clockwise direction, so that the declination angle θd of the monitor is increased.

At that time, the declination angle θd of the monitor relative to the magnitude of the force $F_2$ applied to the front upper end of the monitor, does not exceed a maximum declination angle or predetermined angle. Preferably, the maximum declination angle is set to an angle of 5°.

Different from the prior art, since the weight of the monitor is supported by the restoring force of the torsion spring 603 provided on the hinge shaft 600 of the hinge assembly 6, the tilting angle of the monitor may be easily adjusted by applying a slight operating force to the monitor.

Since the moment equilibrium of the monitor is broken off by a slight force, after the tilting angle of the monitor is adjusted, the moment equilibrium thereof may be again maintained. Accordingly, the user may adjust the tilting angle of the monitor easily.

As described above, both ends of the hinge assembly 6 are engaged to the tilting angle setting member 606 with the aerospace groove 606a. Therefore, when the hinge shaft 600 of the tilting angle adjusting mechanism rotates by applying a force to the monitor, the stopper 601a of the mounting bracket 601 is in contact with tile end of the groove 606a, thereby preventing the monitor from being further tilted.

Therefore, the adjusting range of tilting angle of the monitor is determined by the range of the rotating angle of the stopper 601a in the groove 606a.

The swiveling operation of the base assembly according to the present invention will be explained with reference to FIGS. 9A to 9C.

Figure 9A:
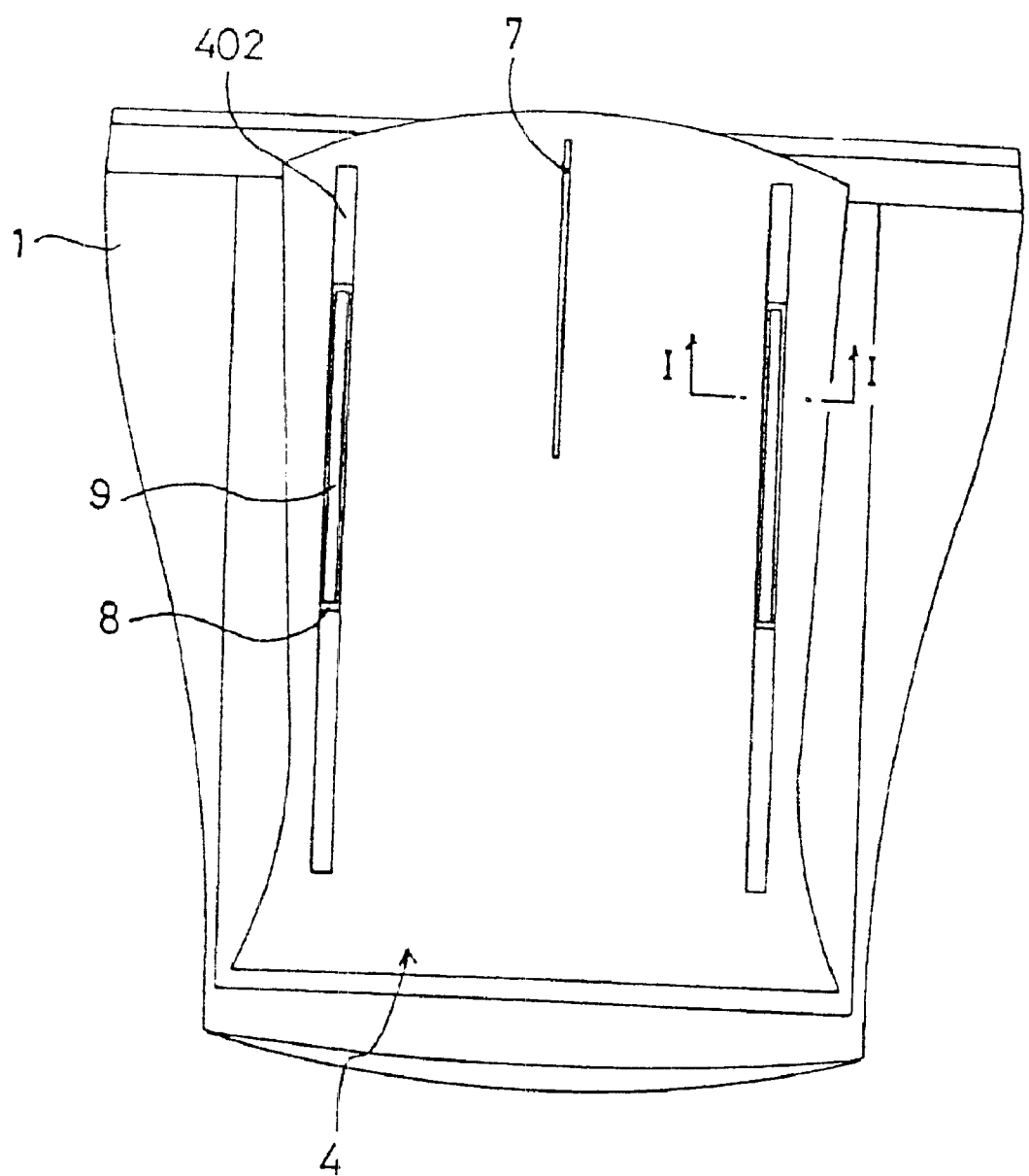

FIG. 9A is a bottom view of the state in which a monitor is positioned in the center of the base assembly, wherein the sliding means movable in a front and back direction along the elongated hole 402 are positioned on a same line to each other.

At that time, the friction member 7 positioned in the groove formed on a center of the bottom of the lower base cover 4, the friction member 9 positioned in the pair of elongated holes 402, and the lower portion of the tilting angle adjusting means are in contact with the horizontal surface, respectively. Since the lower base cover 4 has a rounded shape having a desired curvature, and the lower portion of the tilting angle adjusting mechanism has a rounded shape, the contacted area of the above components and the horizontal surface is very small.

In the above state, if a force is applied to the monitor in a left or right direction, the monitor may swivel or rotate in a left or right direction. First, the case in which the monitor swivels in a left direction will be explained.

In a state where the monitor is positioned in the center as shown in FIG. 9A, if the user applies a force to the right side of the monitor, the friction member 9 positioned in the elongated hole 402 and contacted with the horizontal surface tends to position in its original position due to the weight of the monitor.

Accordingly, the other portion except for the sliding means positioned in the elongated hole 402 is moved in a left direction.

At that time, since the friction member 9 tends to return to its original position due to the friction of the friction member and the horizontal surface, and the monitor and the base rotate in a left direction, the position of the sliding means in the elongated hole is shifted to each other.

Specifically, when the monitor 1 rotates in a left direction, one sliding means positioned in the left elongated hole 402 is moved frontward, and tile other sliding means positioned in the right elongated hole 402 is moved rearward.

Figure 9B:
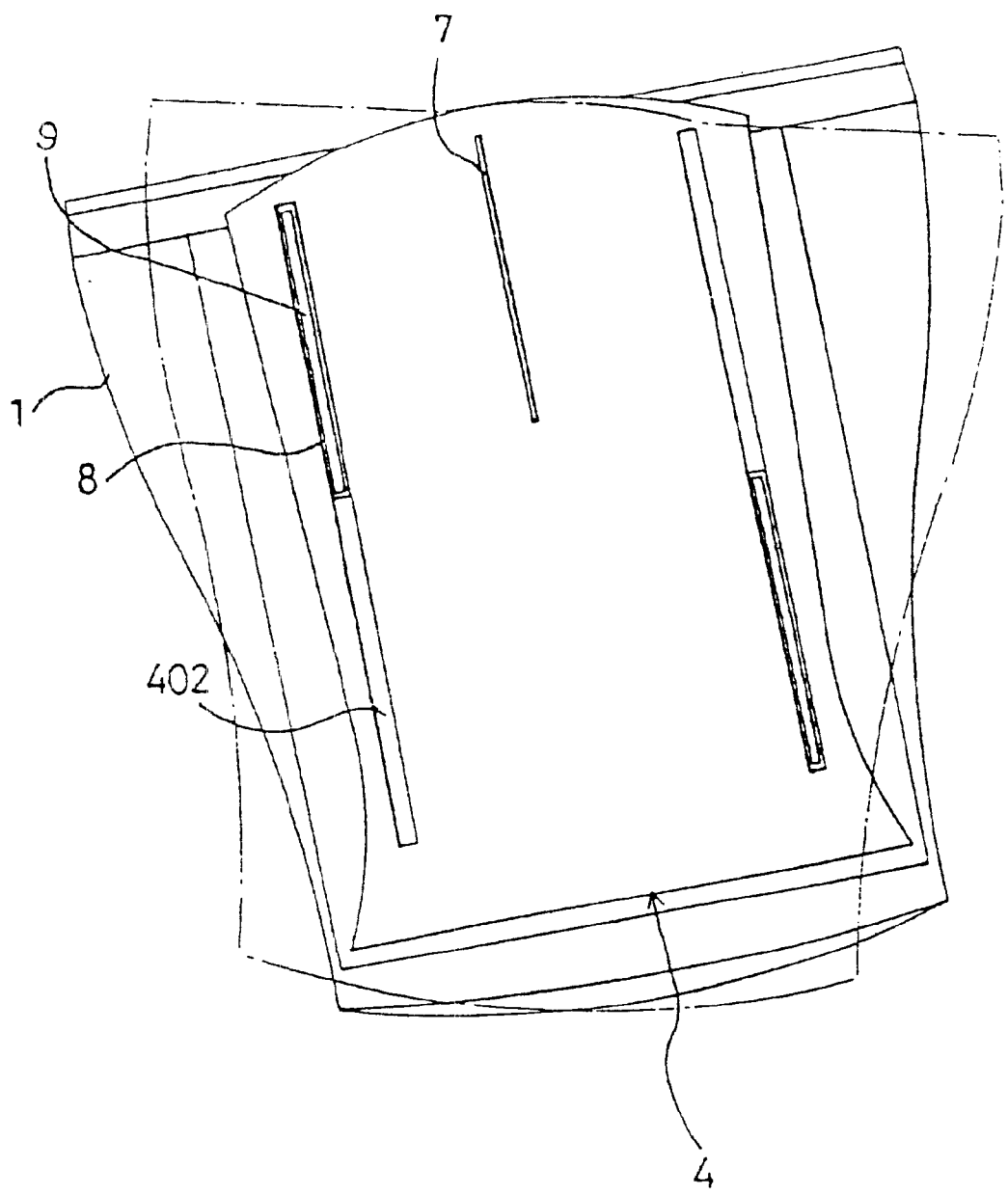

FIG. 9B shows the state where the monitor rotates at its maximum in a left direction.

The case of rotating the monitor in a right direction is similar to the above case.

Specifically, in such a state that the monitor is positioned in the center, if the user applies a force to the left side of the monitor, one sliding means positioned in the left elongated hole 402 is moved rearward, and the other sliding means positioned in the right elongated hole 402 is moved frontward.

Figure 9C:
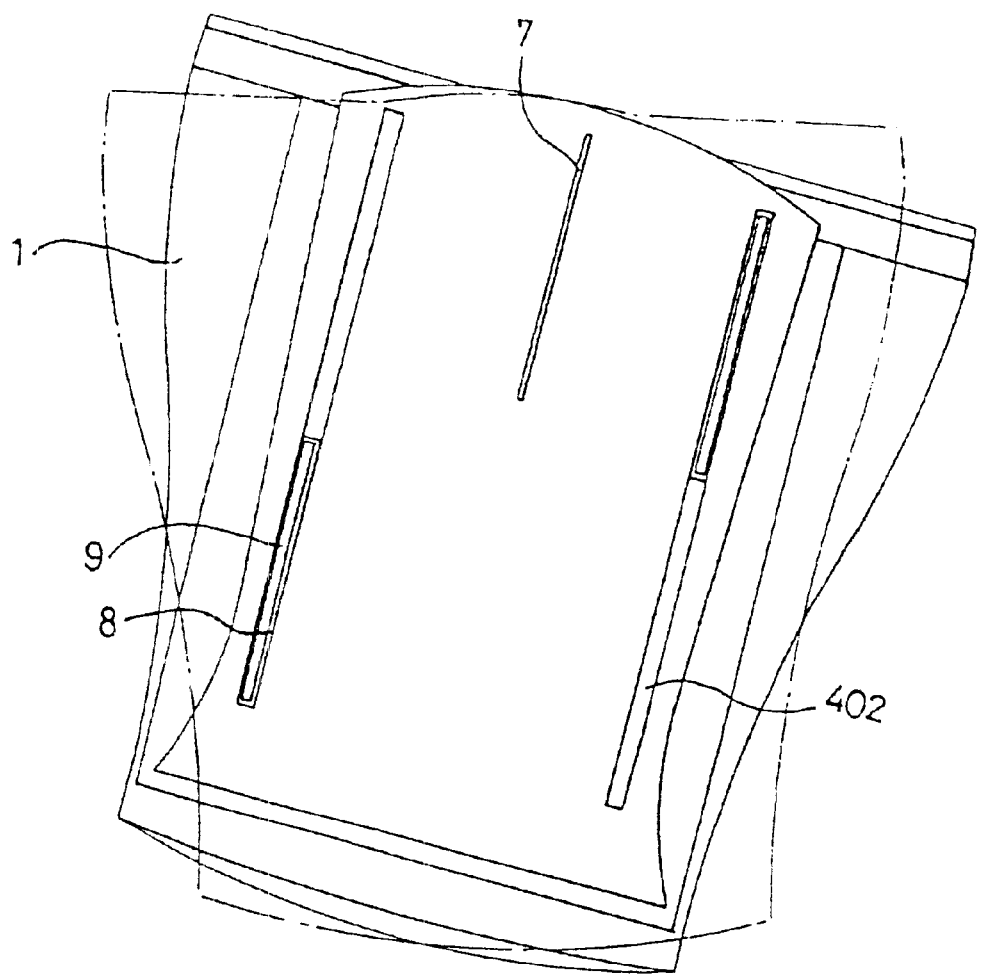

As shown in FIG. 9C, if the monitor rotates at its maximum in a right direction the position of the fiction members 9 in the elongated holes 402 are opposite to the case in which the monitor rotates in a left direction.

The sliding member 8 is transferred with a load of the monitor through the reinforcing ribs 405 and 406 formed on the bottom surface of the upper base cover 3 as shown in FIG. 10, so that the frictional force acts between the friction member 9 and the horizontal surface.

Depending upon the operating force applied to the monitor to swivel the monitor, the monitor 1 and the base 2 swivel in a left or right direction with the friction member 7 based on the rotating center by the shift of the sliding means relative to the elongated hole 401.

It will be noted that the components are fastened by a screw, but other fastening means such as a snap fitting a hook, or a rivet may be used.

For example, the upper base cover 3 is provided on a corner of the lower surface with a protrusion (not shown), and the lower base cover 4 is provided on a corner of the upper surface with a boss (not shown) with an engaging hole corresponding to the position of the protrusion. In the state that the projection of the upper base cover coincides with the boss of the lower base cover, if the upper base cover is pressed against the lower base cover, the projection is snapped into the engaging hole of the boss.

The base assembly according to tile present invention includes a keyboard accommodating space on a front of the base assembly by the feature of the upper and lower base covers.

Specifically, the upper and lower base covers 3 and 4 have a rounded shape having a constant curvature, but the upper surface of the upper base cover is substantially flat. The keyboard can be accommodated into the space between the lower surface of the monitor and the upper surface of the upper base cover.

While the present invention bas been described and illustrated herein with reference to the preferred embodi-

What is claimed is:

1. A base assembly for a video display appliance having a monitor, the base assembly comprising:

an upper base cover integrally formed with a lower portion of the monitor;

a lower base cover coupled to the upper base cover and having a hinge accommodating opening on a center thereof;

a tilting angle adjusting mechanism, coupled to the upper base cover and provided in the hinge accommodating opening of the lower base cover, for tilting the monitor by applying an operating force to the monitor upwards or downwards; and a swiveling angle adjusting mechanism for rotating the monitor, the upper base cover coupled to the monitor, and the lower base cover in a left or right direction.

2. The base assembly as claimed in claim 1, wherein the tilting angle adjusting mechanism includes a hinge assembly, coupled to the upper base cover, for applying a biasing force to the upper base cover, an upper hinge cover coupled to an upper side of the hinge assembly, a lower hinge cover coupled to a lower side of the hinge assembly, and a fastening hole and a fastening boss, each formed on the upper and lower base covers, for interconnecting the upper and lower base covers.

3. The base assembly as claimed in claim 1, wherein the upper base cover includes a mounting portion directly coupled to a lower portion of the monitor, and a plate base portion integrally formed with a lower portion of the mounting portion and having a constant curvature.

4. The base assembly as claimed in claim 1, wherein the swiveling angle adjusting mechanism includes a friction member positioned in the elongated fixing groove of the lower base cover to reduce a frictional force produced between the base and a ground and to serve as a role of a rotating axis, when the monitor swivels or rotates in a left or right direction, and sliding means positioned in the left and right guide holes of the lower base cover and moving along the holes.

5. The base assembly as claimed in claim 1, wherein the upper base cover is provided on a corner of a lower surface wit a protrusion, and the lower base cover is provided on a corner of an upper surface with a boss with an engaging hole corresponding to the position of the protrusion.

6. The base assembly as claimed in claim 1, wherein the bottom of the upper base cover and the top of the lower base cover are provided with a number of reinforcing ribs for reinforcing the strength of the base covers, respectively.

7. The base assembly as claimed in claim 2, wherein the hinge assembly includes a hinge shaft rotatable by a biasing force of a spring, a mounting bracket provided on both ends of the hinge shaft to be engaged to the upper base cover, respectively, a hinge cover fixing bracket provided at a center of the hinge shaft to be engaged to the upper and lower hinge covers, a torsion spring provided on both ends of the hinge shaft, respectively, with one end engaged to the hinge cover fixing bracket and the other end engaged to the mount bracket, a spring washer, provided on both ends of the hinge shaft, for controlling a tension of the torsion spring, and a locking nut for pressing the spring washer and for preventing the spring washer from being released from the hinge shaft.

8. The base assembly as claimed in claim 3, wherein the lower base cover includes a same curvature as that of the plate base portion, an elongated guide hole is formed in left and right sides of the hinge accommodating opening, respectively, and an elongated fixing hole is formed between the elongated guide holes formed on the bottom of the lower base cover.

9. The base assembly as claimed in claim 4, wherein the sliding means includes a sliding member inserted into the hole and having a receiving groove on a lower portion thereof and a flange on an upper portion thereof for a supporting reinforcing rib of the upper base cover, and a friction member positioned in the receiving groove of the sliding member and relatively shifting in the hole together with the sliding member.

10. The base assembly as claimed in claim 4, wherein the friction member is made of rubber or silicon.

* * * * *